United States Patent
Harada et al.

(10) Patent No.: US 10,881,999 B2
(45) Date of Patent: Jan. 5, 2021

(54) AIR CLEANER

(71) Applicant: TOYOTA JIDOSHA KABUSHIKI KAISHA, Toyota (JP)

(72) Inventors: Akira Harada, Anjo (JP); Shunsuke Rikitake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 15/970,966

(22) Filed: May 4, 2018

(65) Prior Publication Data
US 2018/0345197 A1 Dec. 6, 2018

(30) Foreign Application Priority Data

Jun. 2, 2017 (JP) ................................. 2017-110372

(51) Int. Cl.
*B01D 46/44* (2006.01)
*F02M 35/02* (2006.01)
(Continued)

(52) U.S. Cl.
CPC ......... *B01D 46/0047* (2013.01); *B01D 46/10* (2013.01); *B01D 46/444* (2013.01);
(Continued)

(58) Field of Classification Search
CPC .. B01D 46/444; B01D 46/10; B01D 2279/60; B01D 46/0047; F02M 35/0205;
(Continued)

(56) References Cited

U.S. PATENT DOCUMENTS 6,185,998 B1 * 2/2001 Yonezawa ............ F02M 35/021
73/114.34
6,336,361 B1 * 1/2002 Uramachi ............... G01F 1/684
73/202.5
(Continued)

FOREIGN PATENT DOCUMENTS

JP 2000-303921 10/2000
JP 2007-155435 A 6/2007
(Continued)

OTHER PUBLICATIONS

Chinese Office Action dated Mar. 19, 2020 in Chinese Patent Application No. 201810431847.3; 8 pages.
(Continued)

*Primary Examiner* — Robert Clemente
(74) *Attorney, Agent, or Firm* — Oblon, McClelland, Maier & Neustadt, L.L.P.

(57) ABSTRACT

There is provided an air cleaner including: an outlet pipe through which air is discharged; an airflow meter that is inserted toward an interior of the outlet pipe through a wall of the outlet pipe; and a flow-regulating member that is formed projecting from an inner surface of the outlet pipe at a leading end side of the airflow meter, the flow-regulating member including an edge that is formed with a peaked shape with respect to the inner surface and that runs along a direction of flow of air, a rear end that is formed at a downstream end of the edge in the direction of flow, and that is shaped cut sharply toward the inner surface and a width-narrowing portion that decreases in width in a circumferential direction of the outlet pipe on progression downstream in the direction of flow.

6 Claims, 11 Drawing Sheets

(51) Int. Cl.
*B01D 46/00* (2006.01)
*B01D 46/10* (2006.01)

(52) U.S. Cl.
CPC ...... *F02M 35/021* (2013.01); *F02M 35/0207* (2013.01); *B01D 2279/60* (2013.01)

(58) Field of Classification Search
CPC ............ F02M 35/021; F02M 35/0207; F02M 35/024; F02M 35/10262; F02M 35/1211; F02M 35/1216
See application file for complete search history.

(56) References Cited

U.S. PATENT DOCUMENTS

| | | | | |
|---|---|---|---|---|
| 6,871,534 B1 * | 3/2005 | Hamada | ............... | F02D 41/185 73/202.5 |
| 2009/0241683 A1 * | 10/2009 | Perr | ............... | F02M 35/10144 73/861 |
| 2013/0119703 A1 * | 5/2013 | Fujii | ............... | B62D 35/00 296/180.5 |
| 2013/0125635 A1 * | 5/2013 | Itakura | ............... | G01M 15/04 73/114.32 |
| 2016/0280287 A1 | 9/2016 | Fujii et al. | | |
| 2018/0023524 A1 | 1/2018 | Rikitake et al. | | |

FOREIGN PATENT DOCUMENTS

| | | | | |
|---|---|---|---|---|
| JP | 2010-270662 A | 12/2010 | | |
| JP | 2012-246933 | 12/2012 | | |
| JP | 2013-108784 | 6/2013 | | |
| JP | 2014-156854 A | 8/2014 | | |
| JP | 2015-083459 | 4/2015 | | |
| JP | 2015-209816 | 11/2015 | | |
| JP | 2015209816 A | * 11/2015 | ............ | F02D 35/00 |
| WO | 2011/138931 A1 | 11/2011 | | |

OTHER PUBLICATIONS

U.S. Office Action dated Mar. 25, 2020 in corresponding U.S. Appl. No. 15/970,978, 32 pages.
U.S. Office Action issued in U.S. Appl. No. 15/970,978 dated Jul. 7, 2020.

* cited by examiner

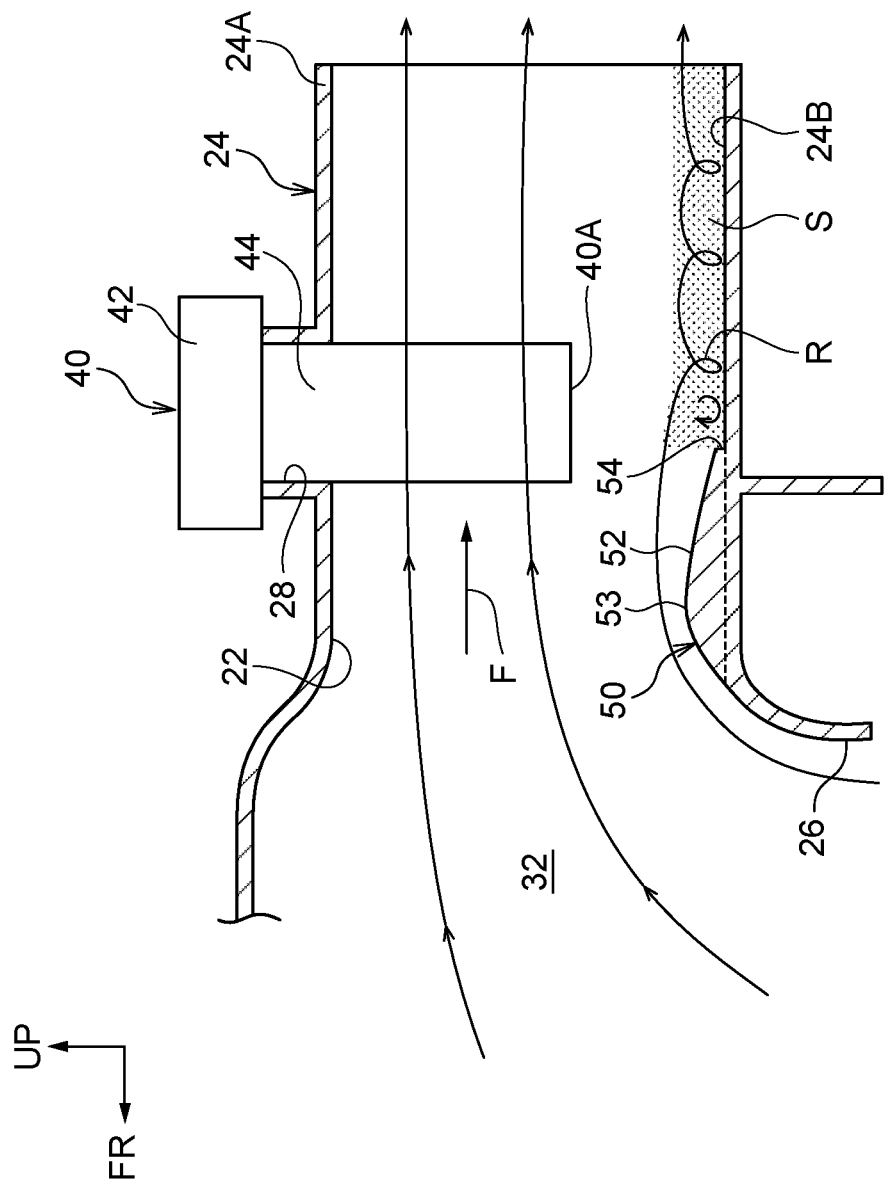

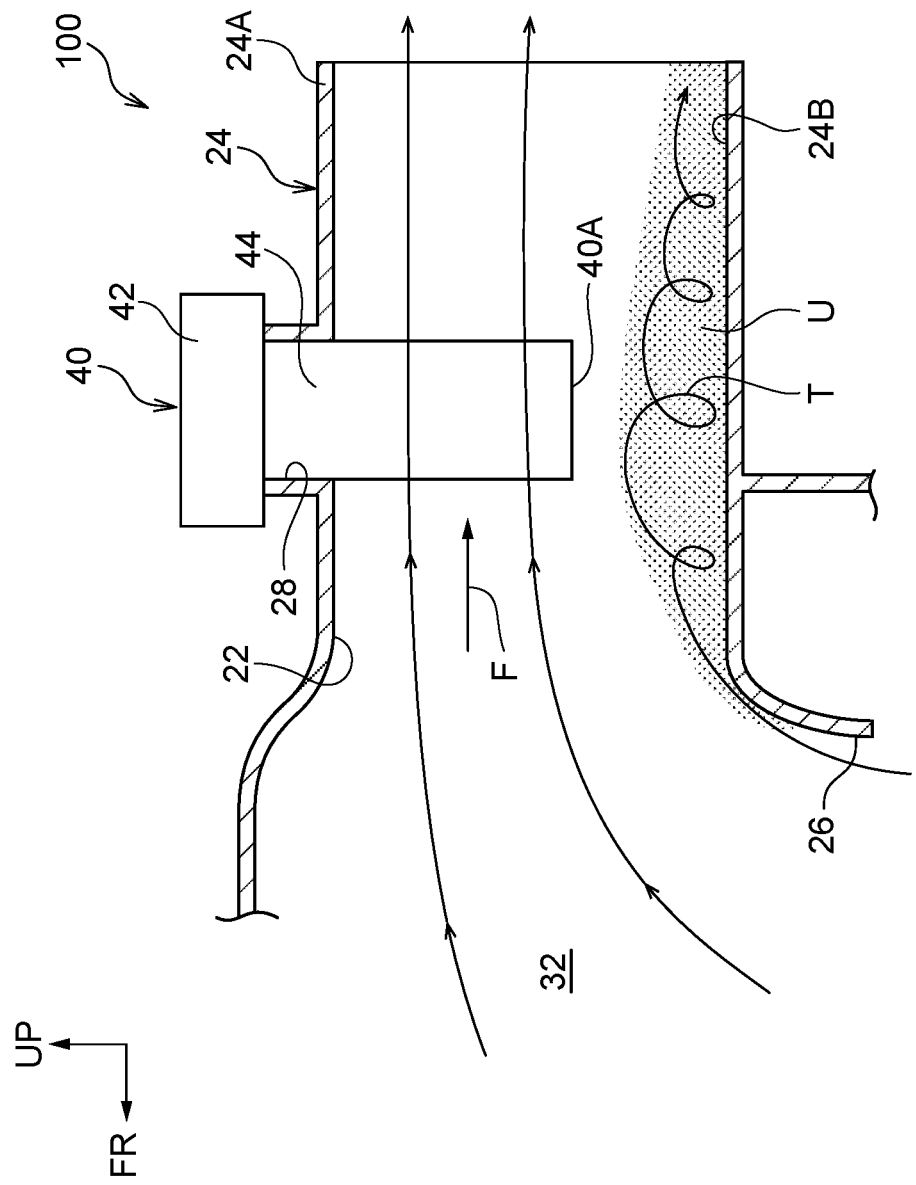

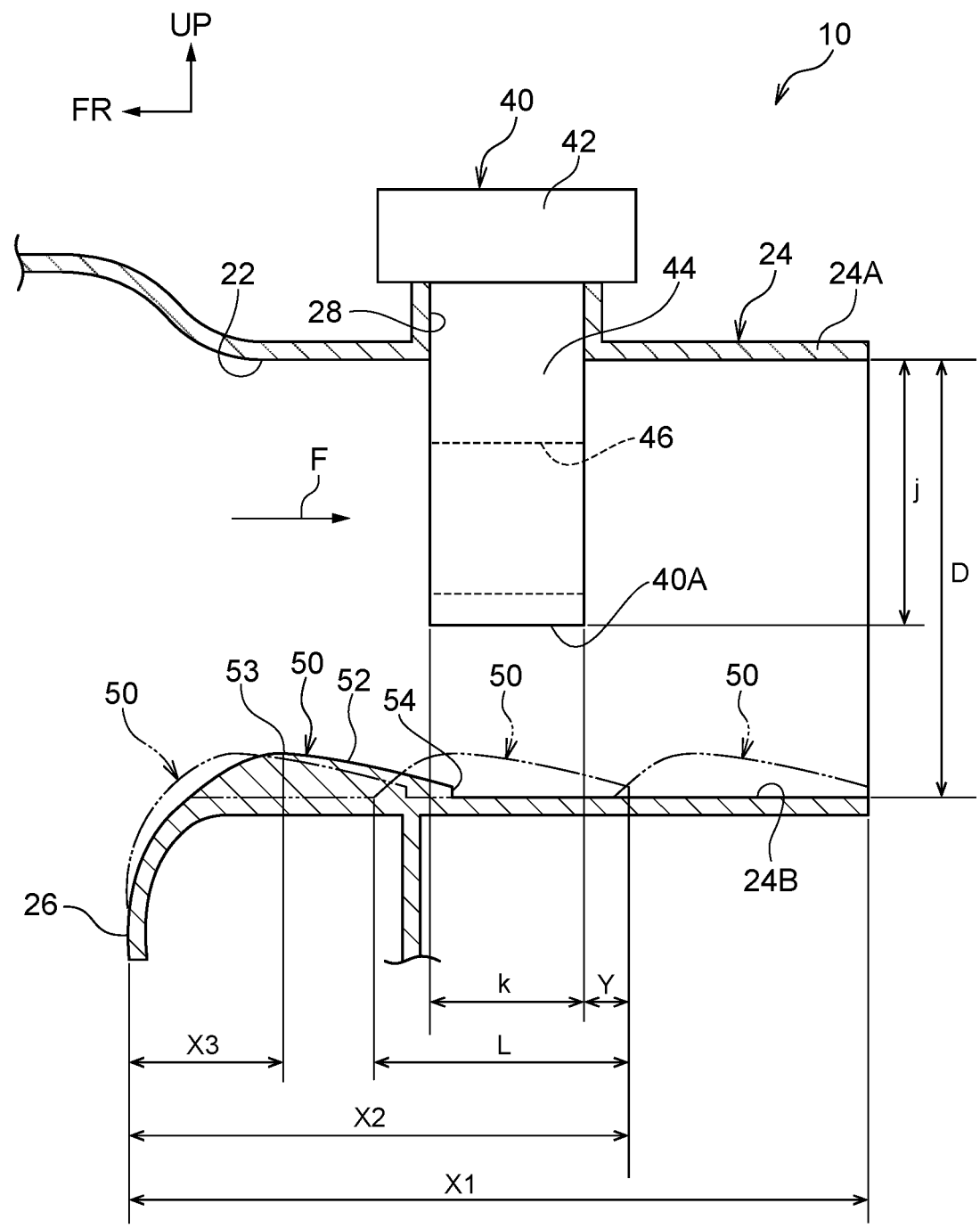

AIR CLEANER

CROSS-REFERENCE TO RELATED APPLICATION

This application is based on and claims priority under 35 USC 119 from Japanese Patent Application No. 2017-110372 filed on Jun. 2, 2017, the disclosure of which is incorporated by reference herein.

BACKGROUND

Technical Field

The present disclosure relates to an air cleaner.

Related Art

Japanese Patent Application Laid-Open (JP-A) No. 2000-303921 discloses an air cleaner. In this air cleaner, an airflow meter is inserted into an outlet pipe (air lead-out passage cylinder) integrally formed to a cap that is part of a housing that houses a filter element, and a tubular flow-regulating member is provided upstream of the airflow meter.

However, when airflow changes abruptly in the vicinity of an inlet of an outlet pipe provided with a flow-regulating member, such as in the air cleaner of JP-A 2000-303921, separation and deflection occur in the flow of air entering from the filter element.

When such airflow separation and deflection occurs, turbulent air flows toward the airflow meter, introducing variation into the quantity of air measured thereby.

SUMMARY

In consideration of the above circumstances, an object of the present disclosure is to provide an air cleaner in which airflow separation and deflection occurring at the inlet of an outlet pipe is suppressed and a stable stream of air is able to flow into an airflow meter.

An air cleaner according to a first aspect of the present disclosure includes an outlet pipe through which air is discharged, an airflow meter that is inserted toward an interior of the outlet pipe through a wall of the outlet pipe, and a flow-regulating member that is formed projecting from an inner surface of the outlet pipe at a leading end side of the airflow meter. The flow-regulating member includes an edge that is formed with a peaked shape with respect to the inner surface and that runs along a direction of flow of air, a rear end that is formed at a downstream end of the edge in the direction of flow and that is shaped cut sharply toward the inner surface; and a width-narrowing portion that decreases in width in a circumferential direction of the outlet pipe on progression downstream in the direction of flow.

The first aspect relates to an air cleaner that includes a flow-regulating member that is formed projecting from an inner surface of an outlet pipe. An airflow meter is inserted toward an interior of the outlet pipe of the air cleaner through the surface of the wall. The airflow meter detects the quantity of air passing through the outlet pipe. The flow-regulating member is provided on the inner surface of the outlet pipe at the leading end side of the inserted airflow meter. The flow-regulating member, when the inner surface of the outlet pipe is considered a ground plane, has a peaked shape that gradually increases in height on progression downstream in a direction of flow of air and then gradually decreases in height. A downstream end of the flow-regulating member is shaped cut sharply toward the inner surface. Further, when a circumferential direction of the outlet pipe is considered a width direction, the flow-regulating member has a width-narrowing portion that decreases in width on progression downstream in the direction of flow.

Due to the flow-regulating member being provided on the inner surface at the leading end side of the airflow meter in the outlet pipe, the first aspect enables orderly longitudinal vortices to be generated downstream of the flow-regulating member in the direction of flow. As a result, airflow can be made to run along the flow-regulating member. Further, the appearance of separation vortices occurring at the inlet of the outlet pipe is able to be suppressed due to the air flowing past the leading end side of the airflow meter running along the inner surface within the outlet pipe. Namely, airflow separation and deflection occurring at the inlet of the outlet pipe is suppressed, and a stable stream of air flows into the airflow meter.

An air cleaner according to a second aspect of the present disclosure further includes a housing that houses a filter element, the housing being connected to the outlet pipe such that a direction of passage of air through the filter element and the direction of flow cross each other. Further, the flow-regulating member is provided on the filter element side of the outlet pipe.

The second aspect has as a premise that the direction of passage of air through the filter element and the direction of flow through the outlet pipe cross each other, namely, that the path of airflow is curved. Further, the flow-regulating member is provided on the filter element side of the outlet pipe at the inside of the curved flow path.

Due to the flow-regulating member being provided at the inside of the flow path where the flow of air abruptly changes, with the second aspect, airflow separation and deflection occurring at the filter element side of the outlet pipe is suppressed, and a stable stream of air flows into the airflow meter 40.

In an air cleaner according to a third aspect of the present disclosure, an apex of the peaked shape of the edge of the flow-regulating member, and a position of maximum width of the flow-regulating member in the circumferential direction of the outlet pipe, are located at an upstream side of the flow-regulating member along the direction of flow.

The third aspect allows a flow-regulating effect within the outlet pipe to be improved as a result of the flow-regulating member being given a cross-section profile resembling an airfoil, with a widened front edge and a pointed rear edge.

In an air cleaner according to a fourth aspect of the present disclosure, the outlet pipe is formed using a mold that parts in the direction of flow, and an apex of the peaked shape of the edge of the flow-regulating member is disposed at a parting line of the mold for the outlet pipe.

Due to aligning the apex of the peaked shape of the flow-regulating member with the parting line of the mold for the outlet pipe, the fourth aspect enables the flow-regulating member to be integrally formed to the outlet pipe using a two-part split mold. A complex split mold for molding the flow-regulating member is thereby unnecessary, enabling manufacturing costs to be kept down.

The air cleaner of the present disclosure suppresses airflow separation and deflection occurring at the inlet of an outlet pipe, thereby enabling the flow of a stable stream of air into an airflow meter.

BRIEF DESCRIPTION OF THE DRAWINGS

Exemplary embodiments of the present disclosure will be described in detail based on the following figures, wherein:

FIG. 5 is a diagram (side-view cross-section) explaining operation of an air cleaner of an exemplary embodiment;

FIG. 6 is a diagram (side-view cross-section) explaining operation of an air cleaner of a comparative example;

FIG. 7 is a diagram (side-view cross-section) explaining positional relationships for a flow-regulating member in an outlet pipe section of an air cleaner of an exemplary embodiment;

DETAILED DESCRIPTION

Explanation follows regarding an air cleaner according to an exemplary embodiment of the present disclosure, with reference to FIG. 1 to FIG. 4. Note that in each the drawings, for ease of explanation, the arrow FR indicates a device front, the side opposite thereto is the device rear, and the direction running between the device front and the device rear is a device front-rear direction. The arrow UP indicates a device upper side, the side opposite thereto is the device lower side, and the direction running between the device upper side and the device lower side is a device up-down direction. Further, the arrow RH indicates a device right, the arrow LH indicates a device left, and the direction running between the device right and the device left is a device width direction. Note that the orientation of the air cleaner with respect to a vehicle body or the like is not limited by these definitions of directions.

Basic Configuration of Air Cleaner

Figure 1:
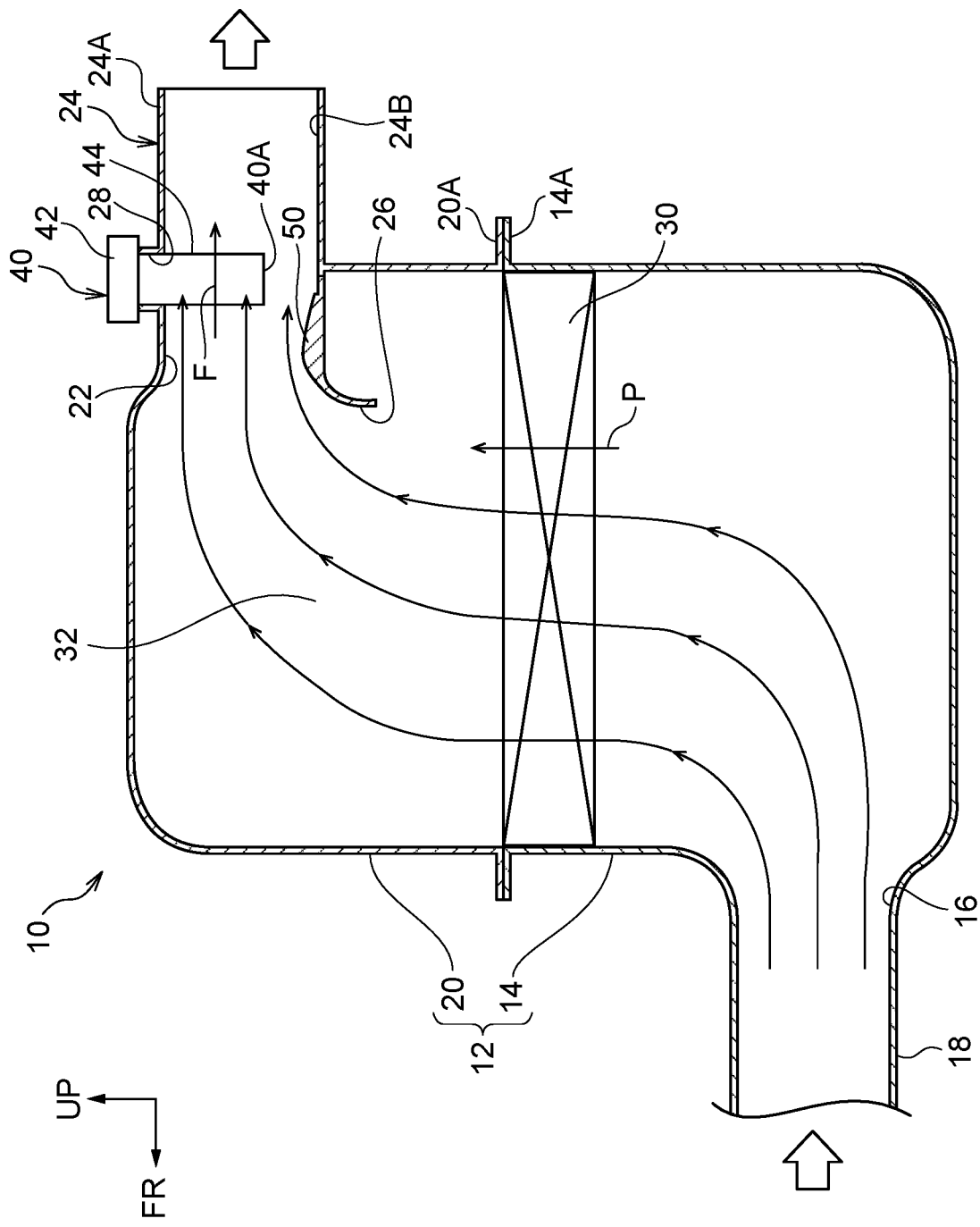
FIG. 1 is a side-view cross-section of an air cleaner of an exemplary embodiment.
Figure 2:
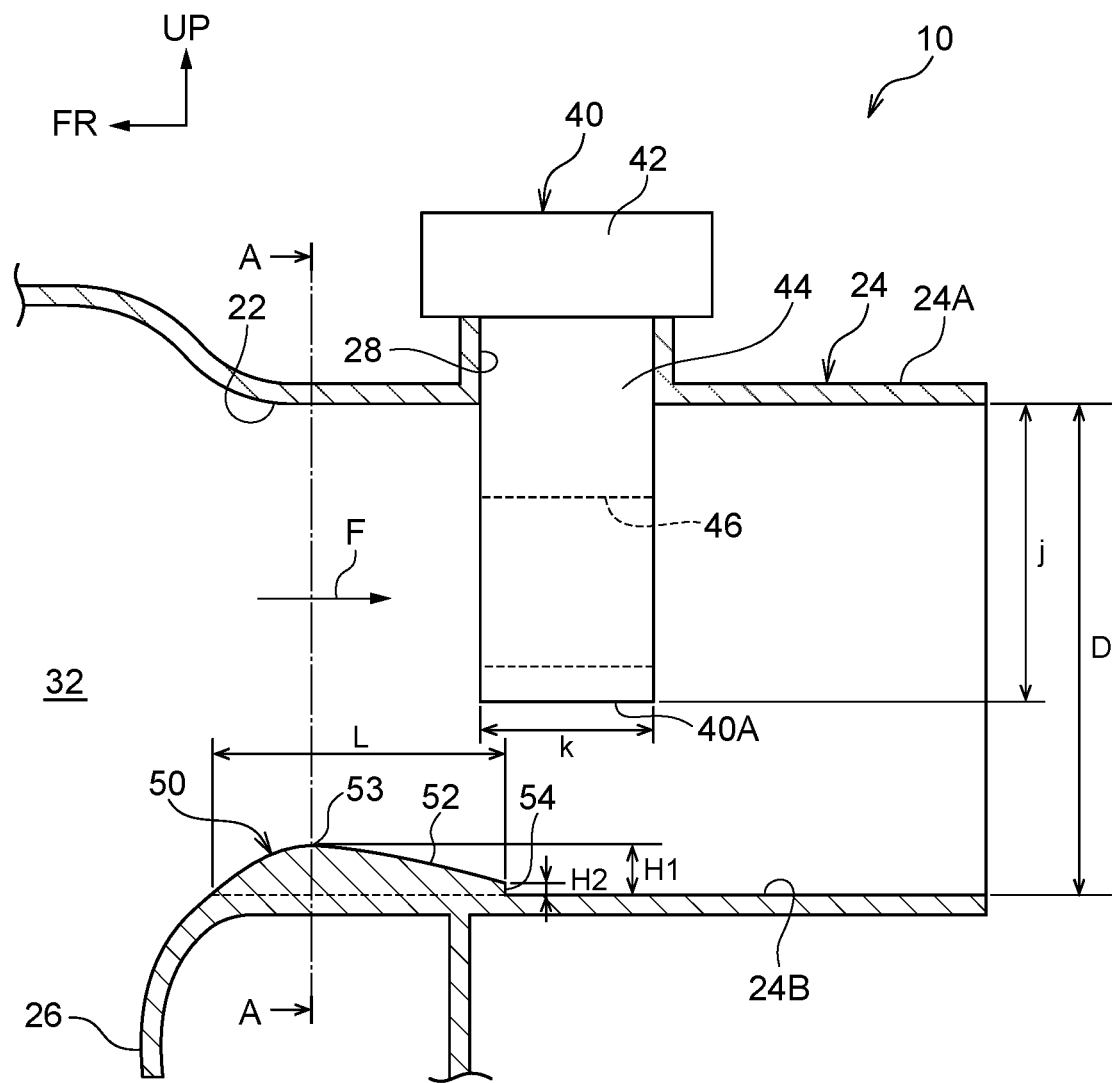
FIG. 2 is a side-view cross-section of an outlet pipe section of an air cleaner of an exemplary embodiment.

FIG. 1 is a vertical cross-section of an air cleaner 10 according to an exemplary embodiment, and FIG. 2 is an enlarged cross-section of an outlet pipe 24. As illustrated in FIG. 1, the air cleaner 10 is a box-type air cleaner that includes a substantially box-shaped housing 12 made of synthetic resin. The housing 12 is disposed inside the engine compartment of a vehicle and is configured including an air cleaner case 14 and a cap 20.

The air cleaner case 14 configures a lower section of the housing 12, and as seen from the outside, is formed substantially in the shape of a box that is open at the device upper side thereof. A flange 14A with an L-shaped cross-section is formed to the upper end of the air cleaner case 14 at the edge of the opening. The flange 14A is used to couple the air cleaner case 14 to the cap 20. A box-like filter element 30 is disposed so as to run along an inner wall of the opening at the upper end of the air cleaner case 14. Namely, the opening at the upper end of the air cleaner case 14 is closed off by the filter element 30.

An intake port 16 through which outside air is introduced is formed in a sidewall at the device lower side of the air cleaner case 14. An inlet pipe 18 is connected to the intake port 16. The inlet pipe 18 is a portion that introduces outside air. One end of the inlet pipe 18 is in communication with the air cleaner case 14, and another end of the inlet pipe 18 is disposed in the engine compartment.

Note that although the inlet pipe 18 of the present exemplary embodiment is integrally formed to the air cleaner case 14, there is no limitation thereto. For example, a tubular connection port may be formed projecting from a wall of the air cleaner case 14, and a separate inlet pipe inserted into the connection port so as to connect the connection port and the inlet pipe together.

The cap 20 configures an upper section of the housing 12, and a device lower side of the cap 20 is coupled to the air cleaner case 14. As seen from the outside, the cap 20 is formed substantially in the shape of a box that is open at the device lower side thereof. A flange 20A with an L-shaped cross-section is formed to the lower end of the cap 20 at the edge of the opening. The flange 20A of the cap 20 and the flange 14A of the air cleaner case 14 are coupled together by a clamp fitting (not illustrated in the drawings) or the like, in a state fitted against each another.

An air intake outlet port 22 through which clean air that has passed through the filter element 30 is discharged is formed in a sidewall at the device upper side of the cap 20. The outlet pipe 24 is connected to the air intake outlet port 22. The outlet pipe 24 is a portion that discharges clean air toward the engine. One end of the outlet pipe 24 is in communication with the cap 20, and another end of the outlet pipe 24 is coupled to an engine intake manifold (not illustrated in the drawings) intake. The inner diameter D of the outlet pipe 24 in the present exemplary embodiment is, for example, set to 60 mm (see FIG. 2). A funnel 26 is also provided in the cap 20. The diameter of the funnel 26 increases on progression from the air intake outlet port 22 toward the inside of the housing 12. A flow-regulating member 50 is provided at the device lower side of the outlet pipe 24 in the vicinity of the inlet of the outlet pipe 24. The flow-regulating member 50 will be described in detail later.

Note that although the outlet pipe 24 and the funnel 26 of the present exemplary embodiment are integrally formed to the cap 20, there is no limitation thereto. For example, a tubular connection port may be formed projecting from a wall of the cap 20, and a separate outlet pipe inserted into the connection port so as to connect the connection port and the outlet pipe together. Further, the outlet pipe may be passed through the wall of the cap 20, and a leading end of the passed outlet pipe inserted into a separate funnel so as to connect the outlet pipe and the funnel together. Note that the outlet pipe 24 of the present exemplary embodiment is formed using a mold that parts in the device front-rear direction. Specifically, the outlet pipe 24 is formed using a combination of a funnel 26-side mold and a pipe-side mold that excludes the funnel 26.

As described above, the air cleaner 10 of the present exemplary embodiment includes the housing 12 that houses the filter element 30. The outlet pipe 24 is connected such that a direction of passage P of air through the filter element 30 and a direction of flow F of air through the outlet pipe 24 in the housing 12 cross each other. Namely, in the present exemplary embodiment, a flow path 32 configuring a route for air curves toward the outlet pipe 24 from the filter element 30.

Figure 3:
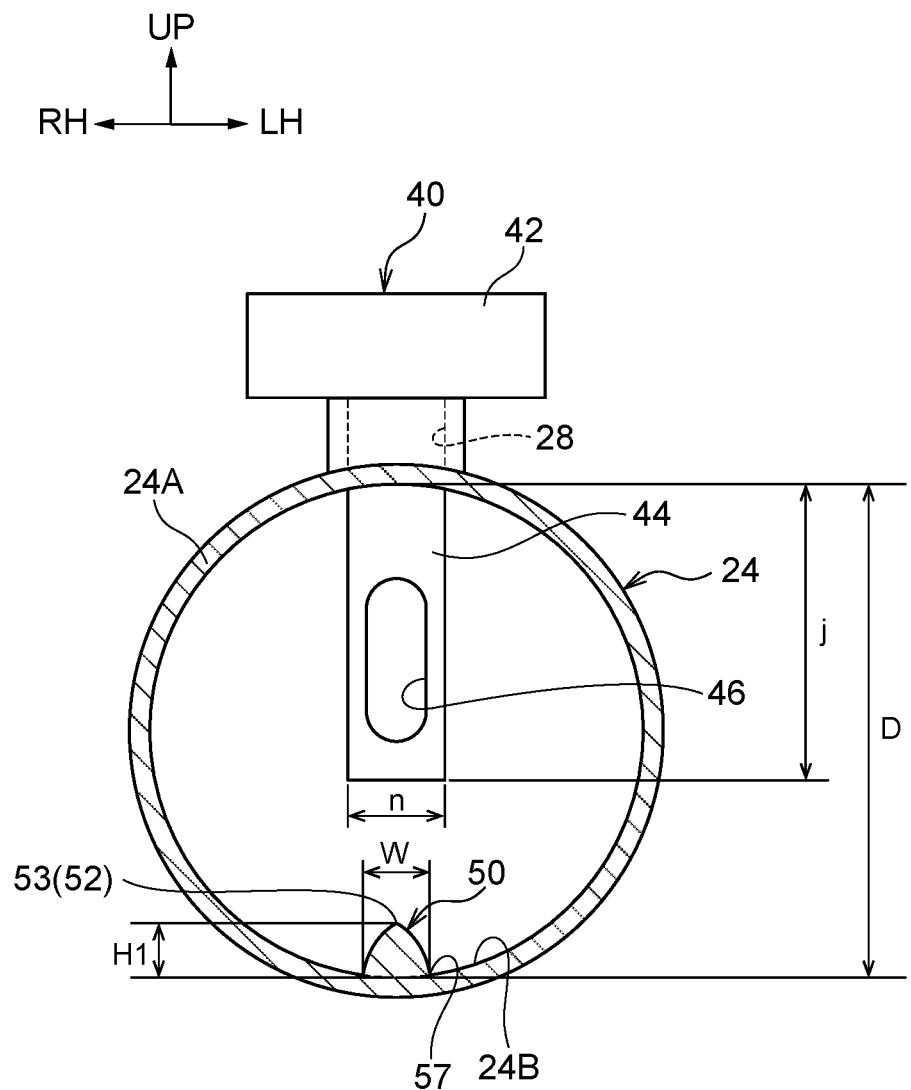
FIG. 3 is a front-view cross-section (a cross-section taken along A-A in FIG. 2) of an outlet pipe section of an air cleaner of an exemplary embodiment.

As illustrated in FIG. 1 to FIG. 3, in the present exemplary embodiment, the airflow meter 40 is inserted toward an interior of the outlet pipe 24 through a wall 24A of the outlet pipe 24. The airflow meter 40 of the present exemplary embodiment is a hot wire airflow meter. An exterior portion of the airflow meter 40 is made of resin, and the airflow meter 40 includes a substantially columnar body portion 42 and a cylindrical measurement portion 44 that extends from the body portion 42. An insertion hole 28 is provided in the wall 24A at the device upper side of the outlet pipe 24. The measurement portion 44 of the airflow meter 40 is inserted into the insertion hole 28, and the body portion 42 of the airflow meter 40 is fixed to a seat (not illustrated in the drawings) formed to the wall 24A using a bolt so as to fix the airflow meter 40 to the outlet pipe 24. Note that in the present exemplary embodiment, as illustrated in FIG. 2 and FIG. 3, the measurement portion 44 has a projection length j of 40 mm, while the inner diameter D of the outlet pipe 24 is 60 mm. Further, the device front-rear direction length k of the measurement portion 44 is 30 mm, and the device width direction width n of the measurement portion 44 is 20 mm. Although not illustrated in the drawings, the body portion 42 includes a connector used to connect to an engine control unit (ECU). Connecting a harness to the connector electrically connects the airflow meter 40 to the ECU.

As illustrated in FIG. 3, a communication port 46 is provided in the cylindrical surface of the measurement portion 44 of the airflow meter 40. A bypass flow path (not illustrated in the drawings), through which air that has entered the communication port 46 is diverted, is provided inside the measurement portion 44. A heating element (not illustrated in the drawings) for measuring a quantity of air is provided partway along the bypass flow path. In the airflow meter 40 of the present exemplary embodiment, air is passed through the communication port 46 such that the quantity of air passing through the outlet pipe 24 is measured by the ECU.

Flow-Regulating Member

As illustrated in FIG. 1 to FIG. 3, the flow-regulating member 50 is formed on an inner surface 24B of the outlet pipe 24 at a leading end 40A side of the airflow meter 40, namely, at the device lower side of the airflow meter 40, so as to project toward the device upper side. The device lower side of the airflow meter 40 where the flow-regulating member 50 is formed corresponds to the filter element 30 side in the housing 12. To explain further, the filter element 30 side corresponds to the inside of a flow path 32 that curves toward the outlet pipe 24 from the filter element 30. The flow-regulating member 50 is provided in the vicinity of an inlet at the device front side of the outlet pipe 24 in the device front-rear direction. Detailed explanation follows regarding the shape of the flow-regulating member 50.

Figure 4A:
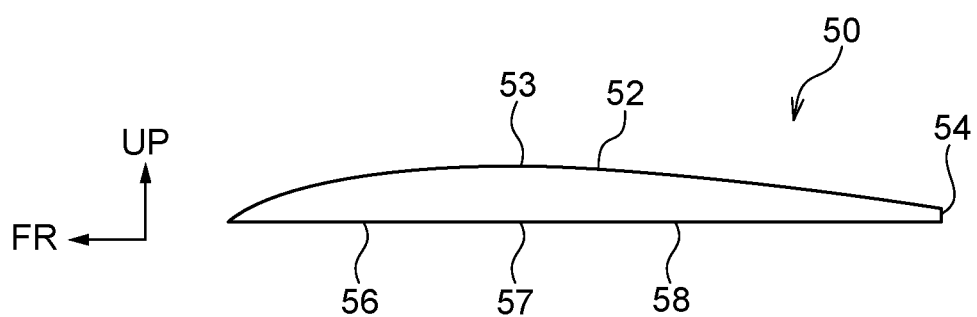
FIG. 4A is a side view of a flow-regulating member in an air cleaner of an exemplary embodiment.
Figure 4B:
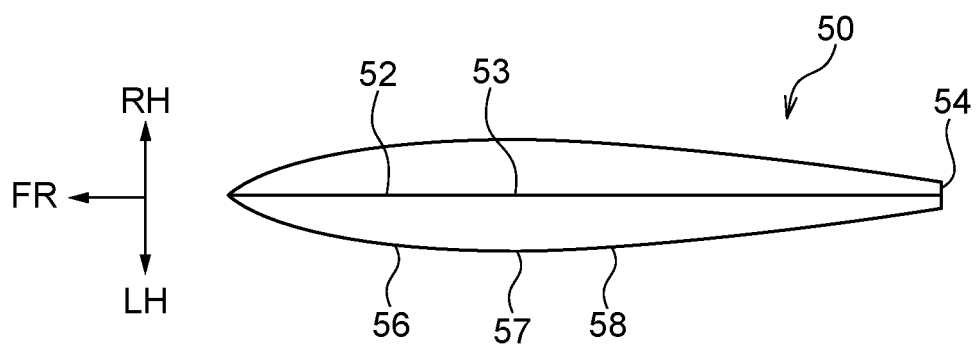
FIG. 4B is a plan view of a flow-regulating member in an air cleaner of an exemplary embodiment.

FIG. 4A and FIG. 4B are for explaining the shape of the flow-regulating member 50 of the present exemplary embodiment, and are external views illustrating only the flow-regulating member 50. As illustrated in FIG. 4A, as seen from the side, an edge 52 of the flow-regulating member 50 runs along the direction of flow F of air, namely, runs from the device front toward the device rear, and is formed with a peaked shape. To explain further, the height of the edge 52 from a ground plane (inner surface 24B) gradually increases until reaching an apex 53, which is the position of maximum height, and then gradually decreases, thereby forming a peaked shape. A rear end 54 of the flow-regulating member 50 is shaped perpendicularly cut sharply toward the ground plane (inner surface 24B) at the device-rear end of the edge 52. Note that in the present exemplary embodiment, the device front-rear direction length L of the flow-regulating member 50 is 50 mm, while the device front-rear direction length k of the measurement portion 44 of the airflow meter 40 is 30 mm (see FIG. 2). A height H1 at the apex 53 of the flow-regulating member 50 from the inner surface 24B is 7 mm, and a height H2 at the rear end 54 of the flow-regulating member 50 from the inner surface 24B is 3 mm (see FIG. 2).

As illustrated in FIG. 4B, in plan view, the flow-regulating member 50 includes a width-widening portion 56 and a width-narrowing portion 58. The width of the width-widening portion 56 along the circumferential direction of the outlet pipe 24 (the device width direction) increases on progression from the device front toward the device rear. The width of the width-narrowing portion 58 decreases on progression toward the device rear from the rear end of the width-widening portion 56. Note that in the present exemplary embodiment, the maximum width W of the flow-regulating member 50 in the device width direction is 10 mm (see FIG. 3).

Disposing the flow-regulating member 50 configured as above within a stream of air generates airflow along the edge 52. This produces a flow-regulating effect within the outlet pipe 24.

In the present exemplary embodiment, in the device front-rear direction, the position of the apex 53 of the flow-regulating member 50, which is at the position of a maximum height H1 in the device up-down direction, is aligned with the position of a peripheral end 57 of the flow-regulating member 50, which is at the position of a maximum width W in the device width direction. Further, in the present exemplary embodiment, the device front-rear direction positions of the apex 53 and the peripheral end 57 of the flow-regulating member 50 are set so as to be further toward the device front than the device front-rear direction center of the flow-regulating member 50.

Due to the flow-regulating member 50 configured as above having a cross-section profile resembling an airfoil, with a widened front edge and a pointed rear edge, the flow-regulating effect within the outlet pipe 24 is able to be improved.

Operation and Advantageous Effects

In the air cleaner 10 of the present exemplary embodiment, the flow-regulating member 50 is provided on the inner surface 24B at the device lower-front of the outlet pipe 24. The outlet pipe 24 provided with the flow-regulating member 50 of the present exemplary embodiment exhibits the following operation and advantageous effects. Note that in the following explanation, comparison is made to an air cleaner of related technology (a comparative example) not provided with a flow-regulating member 50, with reference to FIG. 5 and FIG. 6.

FIG. 6 is a diagram explaining the flow of air in an outlet pipe 24 of an air cleaner 100 of related technology, this being the comparative example. Note that in the comparative example, configuration that is the same as that in the present exemplary embodiment is given the same reference numeral. As illustrated in FIG. 6, the outlet pipe 24 of the comparative example is configured the same as the present exemplary embodiment, except for that it does not include a flow-regulating member 50. Namely, in the comparative example, a flow path 32 is formed curving toward the outlet pipe 24 from the filter element 30, similarly to in the present exemplary embodiment (see FIG. 1). In the flow path 32, the flow of air that passes through the filter element 30 toward the device upper side changes direction in front of the air intake outlet port 22 so as to flow toward the device rear. Air flowing along the flow path 32 converges in the funnel 26 and enters the outlet pipe 24. Namely, a device lower side of the outlet pipe 24 is the location where the flow of air changes abruptly in the vicinity of the inlet of the outlet pipe 24 (funnel 26).

In the comparative example, as a result of the flow of air abruptly changing in the vicinity of the inlet of the outlet pipe 24, airflow separation occurs at the device lower side of the airflow meter 40 (see line T in FIG. 6). Specifically, in the outlet pipe 24, separation occurs in the vicinity of the airflow meter 40 due to airflow in the vicinity of the device lower end of the outlet pipe 24, corresponding to the inside of the flow path 32, being unable to run along the inner surface 24B, whereby the airflow starts rising up toward the device upper side of the outlet pipe 24, corresponding to the outside of the flow path 32. Since airflow is obstructed where separation occurs (see region U in FIG. 6), airflow deflection occurs in the outlet pipe 24. As region U widens, the effective cross-sectional area of the outlet pipe 24 through which air passes is reduced.

Thus, in the comparative example, due to airflow separation and deflection at the inlet of the outlet pipe 24, turbulent air (separation vortices) flows into the airflow meter 40 inserted in the outlet pipe 24. This causes variation in the detection of airflow by the airflow meter 40. Measurement error between the quantity of air detected by the airflow meter 40 and the quantity of air passing through the outlet pipe 24, namely the quantity of air actually flowing into the engine, causes variations in engine output and torque.

In contrast thereto, since the present exemplary embodiment is provided with the flow-regulating member 50, airflow separation such as that in the comparative example is suppressed despite the abrupt change in the flow of air in the vicinity of the inlet of the outlet pipe 24. Detailed explanation follows with reference to FIG. 5.

First, in cases in which the flow-regulating member 50 is provided within the stream of air in the outlet pipe 24, small vortices are generated at the device rear of the flow-regulating member 50 due to the edge 52 being cut sharply at the rear end 54. Orderly longitudinal vortices are thus generated at the device rear of the flow-regulating member 50 (see line R in FIG. 5).

Then, the area near the inner surface 24B where the longitudinal vortices were generated is supplied with momentum from a upper layer with strong momentum toward a lower layer with weak momentum due to the longitudinal vortices arising at the device rear of the flow-regulating member 50. Thereby, the speed of airflow at the device rear of the flow-regulating member 50 increases, and air flows along the flow-regulating member 50.

Due to the flow of air along the flow-regulating member 50, the speed of airflow along the device front-rear direction of the flow-regulating member 50 also increases, and air at the device lower side of the outlet pipe 24 flows along the inner surface 24B. Accordingly, at the inlet of the outlet pipe 24, airflow separation in the vicinity of the airflow meter 40 is suppressed due to airflow not rising toward the device upper side of the outlet pipe 24, corresponding to the outside of the flow path 32, despite the abrupt change in flow at the device lower side of the outlet pipe 24, corresponding to the inside of the flow path 32. Namely, separation vortices that head toward the airflow meter 40 are suppressed. Airflow deflection is also suppressed as a result of the region where flow separation occurs being reduced (see region S in FIG. 5). When airflow separation and deflection occurring at the inlet of the outlet pipe 24 is suppressed, a stable stream of air, not separation vortices, flows into the airflow meter 40, thereby suppressing variation in the detection of airflow by the airflow meter 40. Variations in engine output and torque are also suppressed due to reduced measurement error between the quantity of air detected by the airflow meter 40 and the quantity of air passing through the outlet pipe 24, namely the quantity of air actually flowing into the engine.

Suppressing airflow separation and deflection increases the effective cross-sectional area of the outlet pipe 24 through which air passes, reducing a difference in the speeds of air flowing in the vicinity of the middle of the outlet pipe 24 and of air flowing in the vicinity of the inner surface 24B on the device lower side of the outlet pipe 24. Namely, airflow within the outlet pipe 24 is made more uniform. Making the flow of air flowing through the outlet pipe 24 more uniform and stabilizing the flow of air reduces pressure loss and increases the quantity of air flowing into the engine, enabling engine output to be improved.

Device Front-Rear Direction Position of the Flow-Regulating Member

Additional explanation will now be given regarding device front-rear direction positions of the flow-regulating member 50, with reference to FIG. 7.

The flow-regulating member 50 of the present exemplary embodiment is as a general rule preferably disposed so as to be contained in the entire region from the inlet to the outlet of the outlet pipe 24, namely within region X1 in FIG. 7. The reason for this is that disposing the flow-regulating member 50 in the outlet pipe 24 enables the formation of airflow that runs along the inner surface 24B at the side where the flow-regulating member 50 is disposed. Note that in cases in which the flow-regulating member 50 is disposed at the inlet of the outlet pipe 24, the device-front portion of the edge 52 is formed so as to follow the shape of the funnel 26 and extend more toward the device lower side than the inner surface 24B (see the flow-regulating member 50 at the left end as illustrated using the double-dotted dashed line in FIG. 7). Namely, the edge 52 forms a curved line that extends continuously from the funnel 26.

The flow-regulating member 50 is preferably disposed so as to be contained within a region X2 extending from the inlet of the outlet pipe 24 to a position to the rear of the airflow meter 40, specifically to a position a distance Y (approximately 10 mm) from the rear end of the airflow meter 40. The region X2 is preferable as this is the position where a flow-regulating effect is most strongly exhibited in the vicinity of the airflow meter 40.

Further, when the position where the segments of the mold for the outlet pipe 24 meet is set at a position a distance X3 from the inlet of the outlet pipe 24, by disposing the apex 53 of the flow-regulating member 50 so as to be located at a position corresponding to the distance X3, the position of the apex 53 is aligned with the position of the parting line of the mold for the outlet pipe 24 (corresponding to line A-A in FIG. 2). Thus aligning the apex 53 of the flow-regulating member 50 with the parting line of the mold for the outlet pipe 24 enables the flow-regulating member 50 to be integrally formed to the outlet pipe 24 using a two-part split mold. A complex split mold for molding the flow-regulating member 50 is thereby unnecessary, enabling manufacturing costs to be kept down. Note that in the present exemplary embodiment, the apex 53 is disposed so as to be located at the position corresponding to the distance X3.

MODIFIED EXAMPLES

Figure 8A:
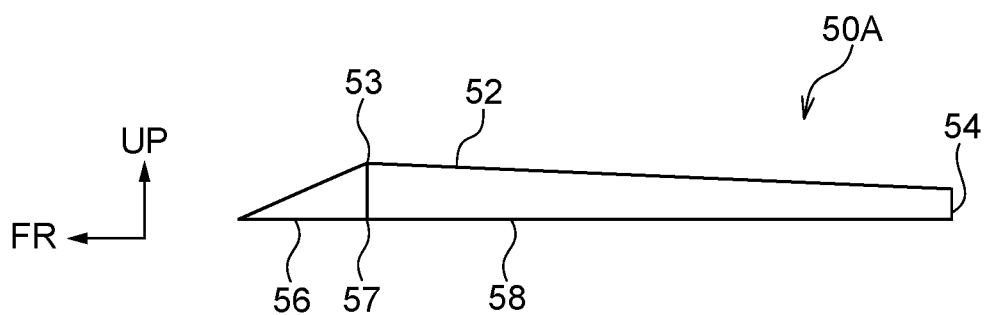
FIG. 8A is a side view of a flow-regulating member in an air cleaner of a first modified example of an exemplary embodiment.
Figure 8B:
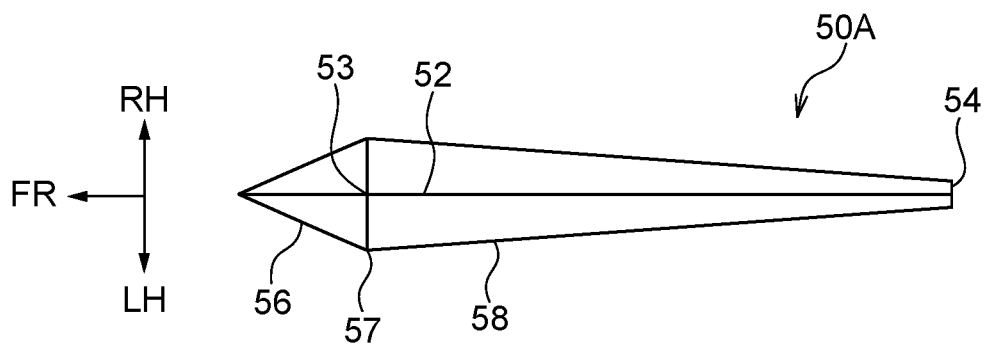
FIG. 8B is a plan view of a flow-regulating member in an air cleaner of the first modified example of an exemplary embodiment.

Explanation follows regarding modified examples that exhibit similar operation and advantageous effects as the exemplary embodiment, First Modified Example As illustrated in FIG. 8A and FIG. 8B, a first modified example includes a flow-regulating member 50A of a different shape than in the exemplary embodiment. Note that in FIG. 8A and FIG. 8B, configuration having the same functionality as for the flow-regulating member 50 of the exemplary embodiment is given the same reference numeral.

As illustrated in FIG. 8A, as seen from the side, an edge 52 of the flow-regulating member 50A is formed with a peaked shape that linearly increases in height from a ground plane (inner surface 24B) and then linearly decreases in height on progression downstream in the direction of flow F of air, namely, on progression toward the device rear. Similarly to in the exemplary embodiment, a rear end 54 of the flow-regulating member 50A is shaped perpendicularly cut sharply toward the ground plane (inner surface 24B) at the device-rear end of the edge 52. As illustrated in FIG. 8B, in plan view, the flow-regulating member 50A includes a width-widening portion 56 and a width-narrowing portion 58. The width-widening portion 56 linearly increases in width on progression toward the device rear from the device front. The width-narrowing portion 58 linearly decreases in width on progression toward the device rear from the rear end of the width-widening portion 56.

Note that in the first modified example, in the device front-rear direction, the position of the apex 53 of the flow-regulating member 50A, which is at the position of maximum height in the device up-down direction, is aligned with the position of a peripheral end 57 of the flow-regulating member 50A, which is at the position of maximum width in the device width direction. Further, the device front-rear direction positions of the apex 53 and the peripheral end 57 of the flow-regulating member 50A are set so as to be further toward the device front than the device front-rear direction center of the flow-regulating member 50A.

Second Modified Example

Figure 9A:
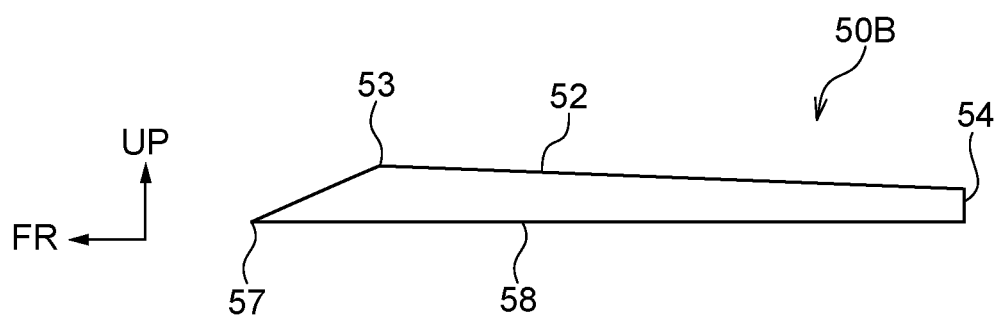
FIG. 9A is a side view of a flow-regulating member in an air cleaner of a second modified example of an exemplary embodiment.
Figure 9B:
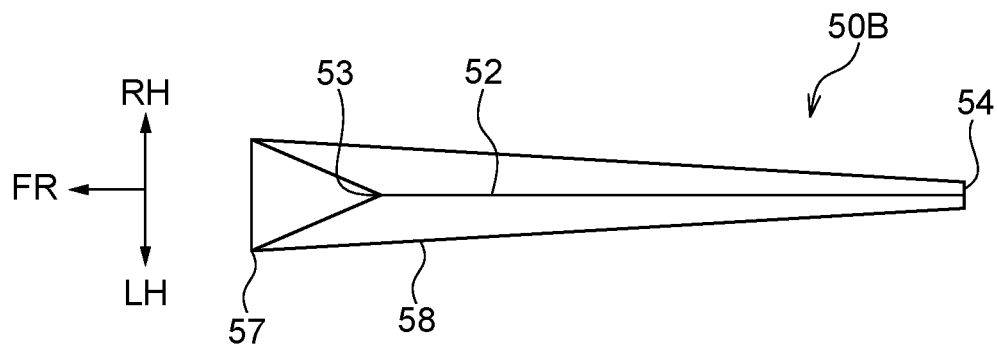
FIG. 9B is a plan view of a flow-regulating member in an air cleaner of the second modified example of an exemplary embodiment.

As illustrated in FIG. 9A and FIG. 9B, a second modified example includes a flow-regulating member 50B of a different shape than in the exemplary embodiment. Note that in FIG. 9A and FIG. 9B, configuration having the same functionality as for the flow-regulating member 50 of the exemplary embodiment is given the same reference numeral.

As illustrated in FIG. 9A, as seen from the side, an edge 52 of the flow-regulating member 50B is formed with a peaked shape that linearly increases in height from a ground plane (inner surface 24B) and then linearly decreases in height on progression downstream in the direction of flow F of air, namely, on progression toward the device rear. Similarly to in the exemplary embodiment, a rear end 54 of the flow-regulating member 50B is shaped perpendicularly cut sharply toward to the ground plane (inner surface 24B) at the device-rear end of the edge 52. Further, as illustrated in FIG. 9B, in plan view, the flow-regulating member 50B includes a width-narrowing portion 58 but does not include a width-widening portion 56 such as that in the exemplary embodiment. The width-narrowing portion 58 linearly decreases in width on progression toward the device rear from the device-front end of the flow-regulating member 50B.

Note that in the second modified example, in the device front-rear direction, the position of the apex 53 of the flow-regulating member 50B, which is at the position of maximum height in the device up-down direction, is not aligned with the position of a peripheral end 57 of the flow-regulating member 50B, which is at the position of maximum width in the device width direction. Further, the device front-rear direction positions of the apex 53 and the peripheral end 57 of the flow-regulating member 50B are set so as to be further toward the device front than the device front-rear direction center of the flow-regulating member 50B (the peripheral end 57 is at the device-front end of the flow-regulating member 50B).

Third to Fifth Modified Examples

Figure 10A:
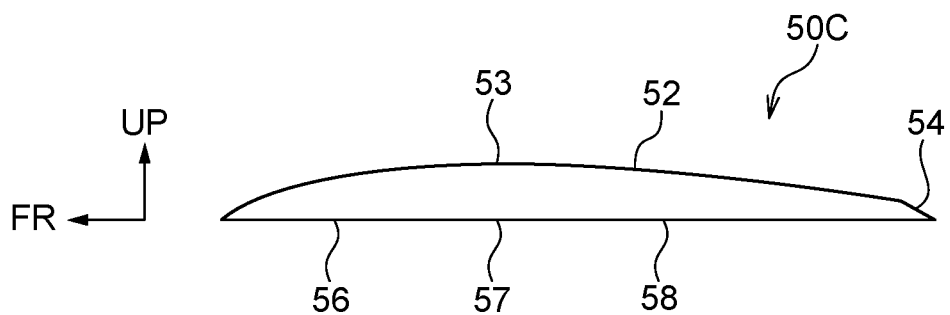
FIG. 10A is a side view of a flow-regulating member in an air cleaner of a third modified example of an exemplary embodiment.
Figure 10B:
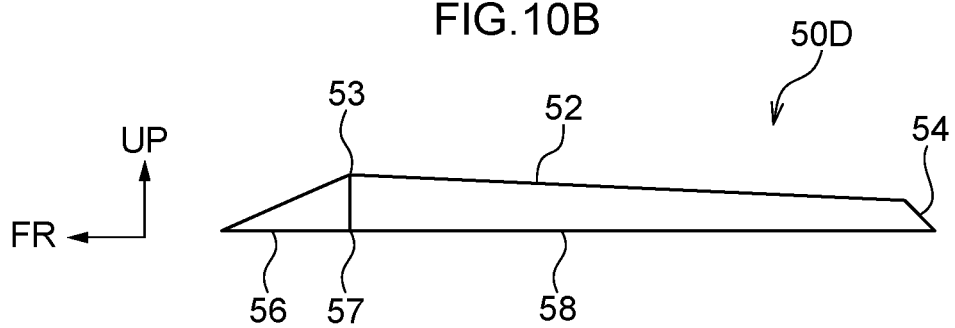
FIG. 10B is a side view of a flow-regulating member in an air cleaner of a fourth modified example of an exemplary embodiment.
Figure 10C:
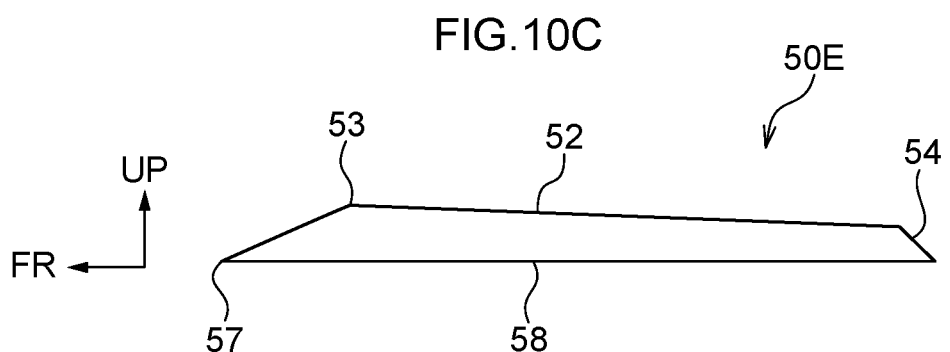
FIG. 10C is a side view of a flow-regulating member in an air cleaner of a fifth modified example of an exemplary embodiment.

FIG. 10A to FIG. 10C illustrate additional modified examples. The rear end 54 of a flow-regulating member 50C of a third modified example illustrated in FIG. 10A differs in shape from that of the flow-regulating member 50 of the exemplary embodiment. The rear end 54 of a flow-regulating member 50D of a fourth modified example illustrated in FIG. 10B differs in shape from that of the flow-regulating member 50A of the first modified example. The rear end 54 of flow-regulating member 50E of a fifth modified example illustrated in FIG. 10C differs in shape from that of the flow-regulating member 50B of the second modified example.

Specifically, although the rear ends 54 in the exemplary embodiment, the first modified example, and the second modified example are shaped perpendicularly cut sharply toward the ground plane (inner surface 24B) at the device-rear ends of the edges 52, the rear ends 54 of the third to fifth modified examples are provided with an incline that decreases in height on progression toward the device rear.

Sixth Modified Example

Figure 11:
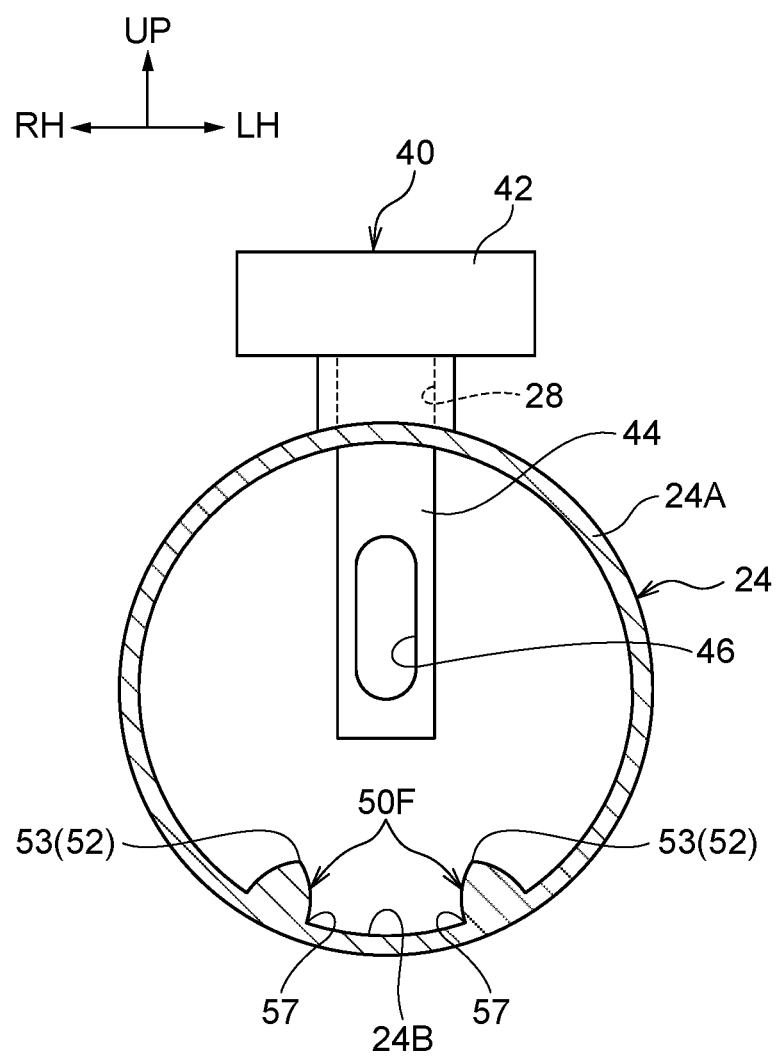
FIG. 11 is a front-view cross-section (a cross-section corresponding to FIG. 3) of an outlet pipe section of an air cleaner of a sixth modified example of an exemplary embodiment.

As illustrated in FIG. 11, in a sixth modified example, two flow-regulating members 50F are disposed on the inner surface 24B of the outlet pipe 24 at positions alongside each other in the device width direction. Note that the flow-regulating members 50F have the same shape as the flow-regulating member 50 of the exemplary embodiment, and so explanation thereof is omitted.

The two flow-regulating members 50F of the sixth modified example enable the formation of a stream of air that runs along the inner surface 24B over a wide region of the inner surface 24B at the device lower side of the outlet pipe 24. Although in the sixth modified example the flow-regulating members 50F are provided with the same shape as the flow-regulating member 50 of the exemplary embodiment, the shape of the flow-regulating members 50F is not limited thereto, and the shape of any of the flow-regulating members in the first to the fifth modified example may be adopted.

The number of flow-regulating members in the outlet pipe 24 is not limited to two, and three of more flow-regulating members may be provided. Note that as the projected area of the flow-regulating members increases, the flow-regulating members themselves become bodies that impede air flowing through the outlet pipe 24. Accordingly, when increasing the number of flow-regulating members, an increase in the total projected area from the plural flow-regulating members with respect to the inner diameter D of the outlet pipe 24 is preferably suppressed by design whereby a dimension of each flow-regulating member is made smaller with respect to the inner diameter D of the outlet pipe 24. Further, it is not necessary for the shapes of the plural flow-regulating members to all be the same.

SUMMARY OF THE EXEMPLARY EMBODIMENT

The air cleaner 10 of the exemplary embodiment possesses the following features.

A first feature is that in the exemplary embodiment, the airflow meter 40 is inserted toward an interior of the outlet pipe 24 through the wall 24A of the outlet pipe 24, and the flow-regulating member 50 is formed projecting from the inner surface 24B of the outlet pipe 24 at the device lower side, this being the leading end 40A side, of the airflow meter 40. The flow-regulating member 50 includes an edge 52 running along a direction of flow F and formed in a peaked shape, a rear end 54 that is formed at the device-rear end of the edge 52 and shaped cut sharply toward the inner surface 24B, and a width-narrowing portion 58 with a width in the device width direction that decreases on progression toward the device rear.

Due to the flow-regulating member 50 being provided on the inner surface 24B at the leading end 40A side (device lower side) of the airflow meter 40 in the outlet pipe 24, the first feature enables orderly longitudinal vortices to be generated downstream of the flow-regulating member 50 in the direction of flow F. As a result, airflow can be made to run along the flow-regulating member 50. Further, the appearance of separation vortices occurring at the inlet of the outlet pipe 24 is suppressed due to the air flowing past the leading end 40A side (device lower side) of the airflow meter 40 run along the inner surface 24B within the outlet pipe 24. As airflow separation is suppressed, airflow deflection is also suppressed in the outlet pipe 24.

Suppressing airflow separation and deflection occurring at the inlet of the outlet pipe 24 has the following advantageous effects. Namely, a stable stream of air, not separation vortices, flows into the airflow meter 40, thereby suppressing variation in the detection of airflow by the airflow meter 40. Variations in engine output and torque are also suppressed due to reduced measurement error between the quantity of air detected by the airflow meter 40 and the quantity of air passing through the outlet pipe 24, namely the quantity of air actually flowing into the engine. Stabilizing the flow of air in the outlet pipe 24 reduces pressure loss and increases the quantity of air flowing into the engine, enabling engine output to be improved.

A second feature is that in the exemplary embodiment, the outlet pipe 24 is connected to the housing 12 such that the direction of passage P of air through the filter element 30 and the direction of flow F of air cross each other, and the flow-regulating member 50 is provided on the filter element 30 side of the outlet pipe 24. That the direction of passage P of air through the filter element 30 and the direction of flow F of air through the outlet pipe 24 cross each other means that the flow path 32, which is a route for air from the filter element 30 toward the outlet pipe 24, is curved. Namely, the flow-regulating member 50 of the exemplary embodiment is provided on the filter element 30 side (device lower side) of the outlet pipe 24 at the inside of the curved flow path 32.

Due to the flow-regulating member 50 being provided at the inside of the flow path 32 where the flow of air abruptly changes, with the second feature, airflow does not rise up toward the device upper side of the outlet pipe 24, corresponding to the outside of the flow path 32, despite the abrupt change in flow at the device lower side of the outlet pipe 24, corresponding to the inside of the flow path 32. Namely, air can be made to flow along the inner surface 24B of the outlet pipe 24, and airflow separation and deflection in the vicinity of the airflow meter 40 is suppressed. A stable stream of air thereby flows into the airflow meter 40.

A third feature is that both the position of the apex 53 of the edge 52, and the position of maximum device width direction width of the flow-regulating member 50 of the exemplary embodiment, are set so as to be upstream in the direction of flow F.

The third feature enables the flow-regulating effect within the outlet pipe 24 to be improved as a result of the flow-regulating member 50 being given a cross-section profile resembling an airfoil, with a widened front edge and a pointed rear edge.

A fourth feature is that in the exemplary embodiment, the outlet pipe 24 is formed using a mold that parts in the direction of flow F, and the apex 53 of the peaked shape of the edge 52 of the flow-regulating member 50 is disposed so as to be positioned at the parting line of the mold for the outlet pipe 24.

Due to aligning the apex 53 of the flow-regulating member 50 with the parting line of the mold for the outlet pipe 24, the fourth feature enables the flow-regulating member 50 to be integrally formed to the outlet pipe 24 using a two-part split mold. A complex split mold for molding the flow-regulating member 50 is thereby unnecessary, enabling manufacturing costs to be kept down.

Note that the respective dimensions of portions in the exemplary embodiment are merely exemplary, and these dimensions may be modified according to an amount of engine exhaust, vehicle type, etc.

What is claimed is:

1. An air cleaner comprising:
an outlet pipe through which air is discharged;
an airflow meter that is inserted toward an interior of the outlet pipe through a wall of the outlet pipe;
a flow-regulating member that is spaced apart from and faces the leading end side of the airflow meter in a radial cross-section of the outlet pipe including the air flow meter, and that is formed projecting at an inner surface of the outlet pipe; and
a housing that houses a filter element, the housing being connected to the outlet pipe such that a direction of passage of air through the filter element and a direction of flow of air in the outlet pipe cross each other,
wherein the flow-regulating member is provided at an in-side of a flow path of air which curves from the direction of passage of air to the direction of flow, and the flow-regulating member includes:

an edge that is formed with a peaked shape with respect to the inner surface and that runs along the direction of flow, a rear end that is formed at a downstream end of the edge in the direction of flow, and that has a shape that is sharply cut towards the inner surface, and a width-narrowing portion that decreases in width along a length of the width-narrowing portion in a downstream direction of the outlet pipe in the direction of flow.

2. The air cleaner of claim 1, wherein:

an apex of the peaked shape of the edge of the flow-regulating member, and a position of maximum width of the flow-regulating member in the circumferential direction of the outlet pipe, are located at an upstream of a midpoint of the flow-regulating member along the direction of flow.

3. The air cleaner of claim 1, wherein:

the outlet pipe is formed using a mold that parts in the direction of flow; and an apex of the peaked shape of the edge of the flow-regulating member is disposed at a parting line of the mold for the outlet pipe.

4. The air cleaner of claim 1, further comprising:

a funnel that is disposed at an upstream end of the outlet pipe in the direction of flow, the funnel increasing in diameter on progression upstream in the direction of flow;

wherein the flow-regulating member is disposed downstream from the funnel in the direction of flow, and the edge of the flow-regulating member forms a curved line extending continuously from the funnel.

5. The air cleaner of claim 1, wherein:

a leading end of the flow-regulating member is positioned upstream of the airflow meter in the direction of flow; and the rear end of the flow-regulating member is positioned downstream of the airflow meter in the direction of flow.

6. The air cleaner of claim 1, further comprising a plurality of flow-regulating members provided at the leading end side of the airflow meter.

\* \* \* \* \*